United States Patent [19]
Barson et al.

[11] 4,108,142
[45] Aug. 22, 1978

[54] PORTABLE BARBEQUE

[75] Inventors: Leslie Barson, Ormond; Frederick Charles Davis, Knoxfield, both of Australia

[73] Assignee: Companion Pty. Limited, Australia

[21] Appl. No.: 700,531

[22] Filed: Jun. 28, 1976

[51] Int. Cl.² .............................................. A47J 37/00
[52] U.S. Cl. .................................. 126/41 R; 126/25 R
[58] Field of Search ............... 126/25 R, 41 R, 39 H, 126/39 J, 39 K; 99/444, 446, 425

[56] References Cited
U.S. PATENT DOCUMENTS

| 3,469,524 | 9/1969 | Trozzolo | 99/425 |
| 3,789,822 | 2/1974 | Schantz | 126/41 R |
| 3,824,984 | 7/1974 | Swanson | 126/25 R |
| 3,938,494 | 2/1976 | Clark | 126/41 R |

*Primary Examiner*—Edward G. Favors
*Attorney, Agent, or Firm*—Wigman & Cohen

[57] ABSTRACT

A portable barbeque having demountable components including a support structure, a gas burner, a flat or domed hotplate above the burner mounted on the support structure, the hotplate having a plurality of peripheral apertures draining cooking liquids from the hotplate into an annular receptacle there beneath.

11 Claims, 4 Drawing Figures

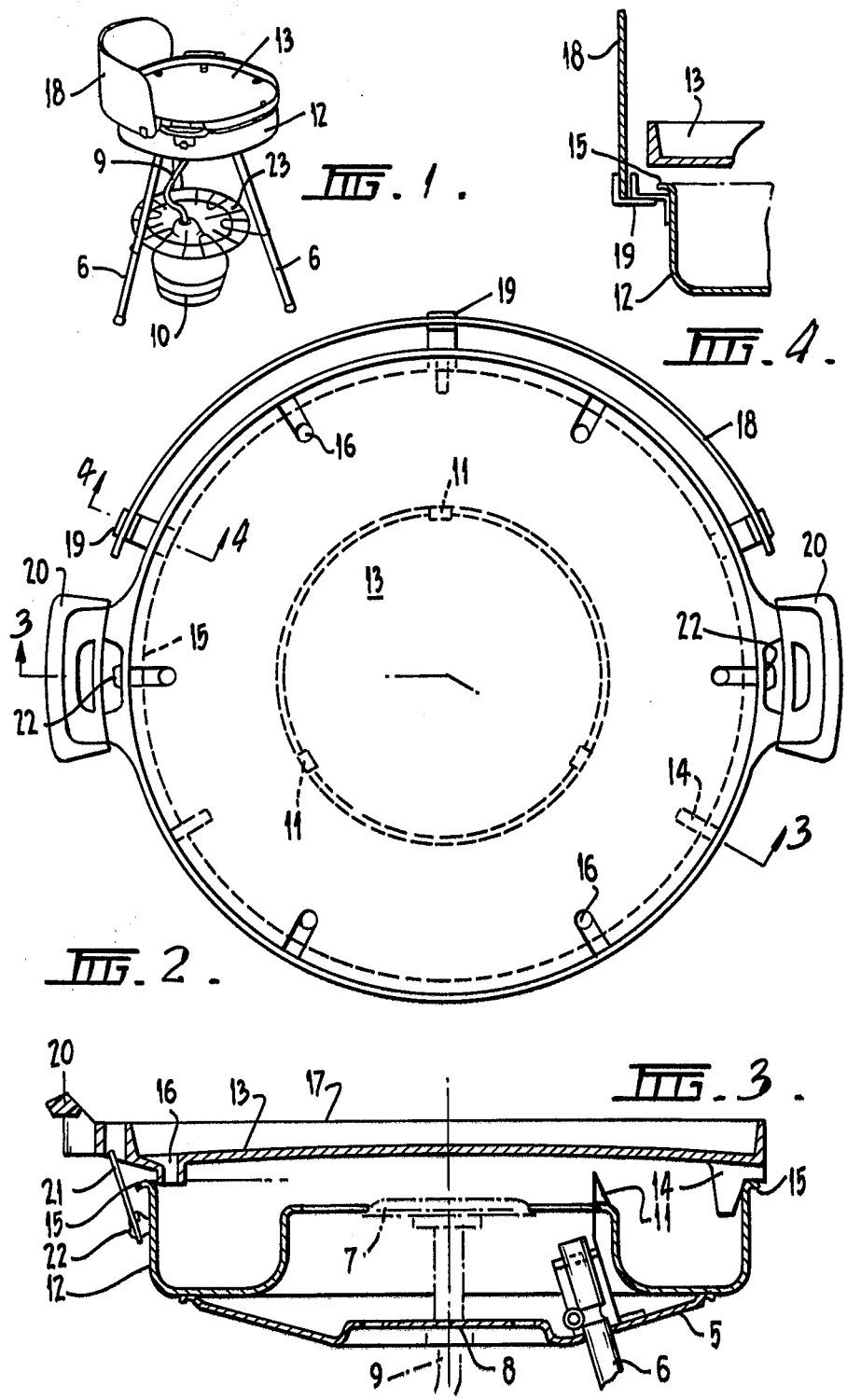

PORTABLE BARBEQUE

BACKGROUND OF THE INVENTION

This invention relates to portable barbeques and particularly but not exclusively to gas fired portable barbeques.

A difficulty encountered in using gas fired barbeques is the collection and disposal of fat and meat juice liberated during a meat cooking operation and it is accordingly the principal objective of this invention to provide means to overcome this problem.

SUMMARY OF THE INVENTION

With the above stated principal objective in view there is provided according to the invention a portable barbeque comprising a structure supporting a hotplate above a gas burner, said hotplate having a plurality of apertures spaced around its periphery to permit fat and/or other liquids liberated during a cooking operation to drain therethrough for collection in a receptacle situated beneath the hotplate.

More specifically there is provided a portable barbeque comprising a structure supporting a substantially circular hotplate above a gas burner, said hotplate having a plurality of apertures spaced around its periphery to permit fat and/or other liquids liberated during a cooking operation to drain therethrough to an annular trough shaped receptacle mounted below the plane of the hotplate.

There is also provided a portable barbeque comprising a support structure, a hotplate supported on the structure burner means beneath the hotplate for heating the hotplate, a plurality of apertures in the hotplate spaced around the hotplate at or near its periphery, a receptacle beneath the hotplate, the apertures acting to drain fat and other liquids liberated during a cooking operation on the hotplate into said receptacle.

Conveniently the upper surface of the hotplate is slightly convex upward to assist fat and liquid drainage from the centre towards the peripheral apertures. Conveniently the hotplate and receptacle may be detachable from the support structure to facilitate cleaning.

Furthermore, the support structure may be dismantled to facilitate packing and transport.

BRIEF DESCRIPTION OF THE DRAWING

A practical arrangement of the invention will now be described with reference to the accompanying drawings in which:

FIG. 1 is a general perspective view of a portable barbeque in accordance with the invention;

FIG. 2 is a plan view of the barbeque shown in FIG. 1;

FIG. 3 is a cross-sectional view taken on the line 3—3 of FIG. 2; and

FIG. 4 is a part cross-sectional view taken on the line 4—4 of FIG. 2.

DETAILED DESCRIPTION OF A PREFERRED EMBODIMENT

Referring now to the drawings the portable barbeque will be described with reference to a gas burner barbeque in which the support structure is constituted by a dish-shaped member 5 having three detachable splayed tubular metal legs 6. A conventional gas burner 7 is mounted at the centre of the dish-shaped member 5 on its upper surface, a gas duct 8 extending through the dish-shaped member to a flexible hose 9 or the like for connection with a gas supply, for example a portable cylinder 10 as shown in FIG. 1.

Mounted on the upper surface of the dish-shaped member 5 are a plurality of clip members 11 to engage and support an annular metal trough 12 having a U-shaped cross-section. A circular cast metal hotplate 13 is located above the trough 12 and maintained in association therewith by a series of projections 14 shaped to engage the outer rim 15 of the trough 12. The upper surface of the hotplate 13 is preferably slightly domed to form an upward convex surface and provided with a plurality of apertures 16 in spaced relationship about its periphery. The plate may be flat however the slight convex curvature assists in drainage of cooking liquids to the outer periphery of the plate.

An upstanding circumferential lip 17 is also provided on the upper surface of the hotplate.

In use, heat produced by the combustion of gas in the burner 7 is directed through the centre void of the annular trough to the under surface of the hotplate 13 and any fat or the like liberated by food particles placed on the upper surface thereof runs towards the periphery and passes through the apertures 16 for collection in the trough 12 thereunder.

When a cooking operation is completed the assembly may be readily dismantled to facilitate transport, and cleaning of the trough and hotplate. If desired, the trough may also be used as a receptacle for the combustion of solid fuel, for example, charcoal, briquettes or the like if gas is not available to fire the burner. Thus the cooking liquids which are predominantly fats draining through the peripheral holes of the plate will assist the combustion of the fuel in the trough.

The clip members 11 on the support 5 engaging the trough permit the trough to be rotated with regard to the support and the provision of a wind shield 18 fixed by brackets 19 on an operator to readily rotate the hotplate or shield to any favourable position.

In the arrangement shown, the hotplate 13 is fitted with handles 20 of a heat insulating material, and each handle is provided with a metal clip 21 which may engage a complementary stud 22 on the trough 12 to lock the hotplate and the trough together.

A wire platform 23 (FIG. 1) may also be included in the assembly serving to support cooking utensils or plates. This platform may be used over the burner to convert the unit to a stove application or fit between the legs as a utensil storage tray.

We claim:

1. A gas fired barbeque comprising a support structure, a hotplate detachably supported on the structure, burner means beneath the hotplate for heating the hotplate, a plurality of apertures in the hotplate spaced around the hotplate at or near its periphery, the apertures being positioned wholly around the hotplate and confined to the periphery, a receptacle beneath the hotplate, the apertures acting to drain fat and other liquids liberated during a cooking operation on the hotplate into said receptacle, clip means associated with the receptacle for removably securing the hotplate to to the receptacle whereby the receptacle can be readily separated from the hotplate for cleaning after use.

2. A portable barbeque according to claim 1 wherein the supporting structure hotplate and receptacle are demountable.

3. A portable barbeque according to claim 2 wherein the hotplate is rotatable relative to the supporting structure.

4. A portable barbeque according to claim 1 wherein said hotplate support structure is formed in one-piece to include said drain receptacle, said drain receptacle comprising an annular trough having a generally U-shaped cross-section.

5. A portable barbeque according to claim 1 wherein said hotplate is slightly domed to assist draining of liquid and fats into the peripheral apertures.

6. A portable barbeque according to claim 1 wherein said hotplate is cast metal and includes an upstanding circumferential lip, a plurality of downwardly projections shaped to engage the outer surface of said annular trough.

7. A portable barbeque as defined in claim 4 wherein said hotplate is generally circular and includes a pair of oppositely mounted handle means for lifting said hotplate off the support for cleaning.

8. A portable barbeque as defined in claim 7 wherein the clip means are carried by each of said handle means for engaging a complementary stud positioned on the outer surface of said trough.

9. A portable barbeque as defined in claim 8 wherein said drain receptacle is removably supported on a dish-shaped member, said dish-shaped member including means for securing removable legs therein.

10. A portable barbeque as defined in claim 9 wherein said drain receptacle includes a central flat portion which merges with said annular trough at the upper edge of the inner wall of said trough, said central flat portion includes an opening, gas burner means including a gas burner head positioned in said central opening for heating the central portion of said hotplate mounted thereabove.

11. A portable barbeque as defined in claim 10 wherein said hotplate is of a circular shape.

* * * * *